United States Patent
Maass et al.

(10) Patent No.: US 9,359,200 B2
(45) Date of Patent: Jun. 7, 2016

(54) METHOD FOR THE PARALLEL PRODUCTION OF HYDROGEN AND CARBON-CONTAINING PRODUCTS

(75) Inventors: Hans-Juergen Maass, Dresden (DE); Volker Goeke, Geretsried (DE); Otto Machhammer, Mannheim (DE); Marcus Guzmann, Muensing (DE); Christian Schneider, Mannheim (DE); Wolfgang Alois Hormuth, St Martin (DE); Andreas Bode, Mannheim (DE); Dirk Klingler, Mannheim (DE); Matthias Kern, Karlsruhe (DE); Grigorios Kolios, Neustadt (DE)

(73) Assignees: BASF SE, Ludwigshafen (DE); Linde Aktiengesellschaft, Munich (DE)

( * ) Notice: Subject to any disclaimer, the term of this patent is extended or adjusted under 35 U.S.C. 154(b) by 50 days.

(21) Appl. No.: 14/131,124

(22) PCT Filed: Jul. 5, 2012

(86) PCT No.: PCT/EP2012/002877
§ 371 (c)(1),
(2), (4) Date: Nov. 21, 2014

(87) PCT Pub. No.: WO2013/004398
PCT Pub. Date: Jan. 10, 2013

(65) Prior Publication Data
US 2014/0127121 A1    May 8, 2014

(30) Foreign Application Priority Data
Jul. 5, 2011   (DE) .......... 10 2011 106 645

(51) Int. Cl.
*C01B 3/24* (2006.01)
*C01B 31/02* (2006.01)
(Continued)

(52) U.S. Cl.
CPC ... *C01B 3/24* (2013.01); *C01B 3/28* (2013.01); *C01B 3/30* (2013.01); *C01B 31/02* (2013.01);
(Continued)

(58) Field of Classification Search
CPC .............. C01B 3/28; C01B 3/30; C01B 31/02
See application file for complete search history.

(56) References Cited

U.S. PATENT DOCUMENTS

| 2,389,636 A | 11/1945 | Ramseyer |
| 2,600,078 A | 6/1952 | Schutte et al. |

(Continued)

FOREIGN PATENT DOCUMENTS

| CA | 2 345 950 A1 | 4/2000 |
| DE | 1 266 273 | 4/1968 |

(Continued)

OTHER PUBLICATIONS

U.S. Appl. No. 14/130,942, filed Apr. 7, 2014, Mass, et al.
(Continued)

*Primary Examiner* — Stanley Silverman
*Assistant Examiner* — Syed Iqbal
(74) *Attorney, Agent, or Firm* — Oblon, McClelland, Maier & Neustadt, L.L.P.

(57) ABSTRACT

The invention relates to a process for parallel preparation of hydrogen and one or more carbonaceous products, in which hydrocarbons are introduced into a reaction space (R) and decomposed thermally to carbon and hydrogen in the presence of carbon-rich pellets (W). It is a feature of the invention that at least a portion of the thermal energy required for the hydrocarbon decomposition is introduced into the reaction space (R) by means of a gaseous heat carrier.

10 Claims, 1 Drawing Sheet

(51) Int. Cl.
*C01B 3/28* (2006.01)
*C01B 3/30* (2006.01)
*C10B 57/00* (2006.01)

(52) U.S. Cl.
CPC ....... *C10B 57/005* (2013.01); *C01B 2203/0272* (2013.01); *C01B 2203/04* (2013.01); *C01B 2203/049* (2013.01); *C01B 2203/0425* (2013.01); *C01B 2203/0485* (2013.01); *C01B 2203/06* (2013.01); *C01B 2203/0805* (2013.01); *C01B 2203/0811* (2013.01); *C01B 2203/0822* (2013.01); *C01B 2203/0827* (2013.01); *C01B 2203/0866* (2013.01); *C01B 2203/1235* (2013.01); *C01B 2203/1258* (2013.01); *Y02P 20/128* (2015.11)

(56) References Cited

U.S. PATENT DOCUMENTS

| 2,799,640 | A | 7/1957 | Pevere et al. |
| 3,259,565 | A | 7/1966 | Kimberlin, Jr. |
| 3,264,210 | A | 8/1966 | Waghorne et al. |
| 5,486,216 | A | 1/1996 | Shigeno et al. |
| 6,670,058 | B2 | 12/2003 | Muradov |
| 2002/0007594 | A1* | 1/2002 | Muradov .......... 48/78 |
| 2007/0111051 | A1 | 5/2007 | Muradov |
| 2007/0186470 | A1 | 8/2007 | Ennis |
| 2009/0220412 | A1 | 9/2009 | Ennis |

FOREIGN PATENT DOCUMENTS

| DE | 2 420 579 | 11/1974 |
| DE | 692 08 686 T2 | 9/1996 |
| DE | 600 16 059 T2 | 11/2005 |
| GB | 644013 | 10/1950 |
| GB | 883751 | 12/1961 |

OTHER PUBLICATIONS

English translation of the International Search Report issued Feb. 8, 2013, in PCT/EP2012/002877.

N. Muradov, et al., "Fossil hydrogen with reduced $CO_2$ emission: Modeling thermocatalytic decomposition of methane in a fluidized bed of carbon particles", International Journal of Hydrogen Energy, vol. 30, No. 10, XP-027750548, Aug. 1, 2005, pp. 1149-1158.

Rainer Reimert, et al., "Gas Production, 2. Processes", Ullmann's Encyclopedia of Industrial Chemistry, vol. 16, 2012, pp. 424-482, plus cover page.

* cited by examiner

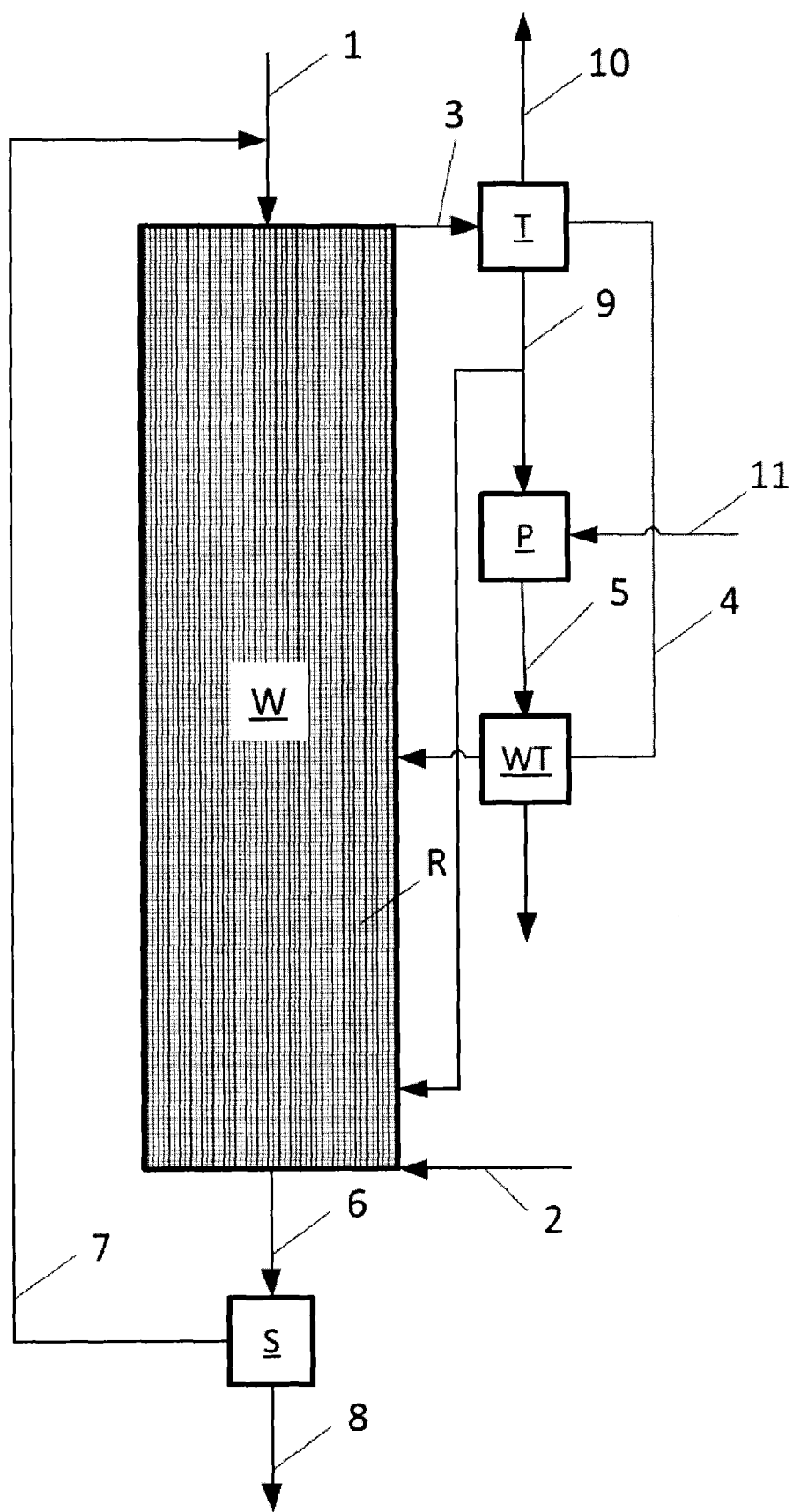

METHOD FOR THE PARALLEL PRODUCTION OF HYDROGEN AND CARBON-CONTAINING PRODUCTS

CROSS-REFERENCE TO RELATED APPLICATIONS

This application is a National Stage of PCT/EP2012/002877 filed on Jul. 5, 2012. This application is based upon and claims the benefit of priority to German Application No. 10 2011 106 645.8 filed on Jul. 5, 2011.

The invention relates to a process for parallel preparation of hydrogen and carbonaceous products, in which hydrocarbons are introduced into a reaction space and decomposed thermally to hydrogen and carbon in the presence of carbonaceous pellets, and at least a portion of the thermal energy required for the hydrocarbon decomposition is provided by means of a gaseous heat carrier which is produced outside the reaction space.

Hydrogen is a key component in the energy and chemical sectors. The global demand for hydrogen is 50 million t/a. The fields of use of carbonaceous products are various; for example, the global demand for coking coal (as a reducing agent in the steel industry) at about 1 billion t/a is one of the largest carbon uses.

CO2-emissions in Germany in 2010 were about 960 million t of CO2 equivalent. The chemical and steel industries contribute a total of about 10% to this, in equal portions. In the steel industry, the specific reducing agent requirement, which is important for the CO2 emissions, has already been lowered to a minimum by rigorous further development of the production processes. Further lowering of the reducing agent requirement by process optimization is achievable only to a limited degree. The same applies to the chemical industry, the CO2 intensity of which depends essentially on the energy requirement of the production processes.

For environmental and economic reasons, in both industries, there are large incentives to lower the CO2 emissions by changing the raw material basis, low-CO2 production technologies, optimization of the energy requirement and utilization of process-related CO2 for large-volume base chemicals. One example of a suitable base chemical is hydrogen.

With regard to a change in the raw material basis, the raw material import dependence of Germany and several other western industrial nations is fundamental. While reliability of natural gas supply for the next few decades is secure within Europe, the maximum will shortly be attained in mineral oil production. The chemical industry has made great efforts to free itself from mineral oil dependence.

In the case of the special coking coal used to a great extent in the steel industry, German coking plants have been 100% reliant on imports since the closure of the Bergwerk Ost coal mine. As a consequence of rising internal demand in the Asian region, the price of coking coal in Germany has risen by a factor of 4 since 2004. The German steel industry currently requires about 10 million t of coke per year, of which 4 million t have to be imported due to lack of coking plant capacity. Coke produced in Germany is produced with addition of tried and tested carbon carriers for coking coal.

According to the prior art, coke is obtained by dry distillation in coking ovens from coking coal. In order to prevent burning of the coke which leaves the coking oven while red hot, it has to be quenched rapidly. Dry or wet cooling processes are used here, which are expensive and/or associated with the release of significant amounts of pollutants.

For use in a blast furnace process, the coke must meet high quality demands with regard to composition, mechanical strength, reactivity and particle size. As a substitute reducing agent for coke, coal dust has increasingly been injected into blast furnaces since the mid-1980s, and the consumption of these injection coals in Germany in 2011 is about 3.8 million t.

At present, steam reforming is used for industrial production of molecular hydrogen. The production of 100 kg of hydrogen using steam reforming gives rise to 1080 kg of CO2. Using natural gas pyrolysis, only 694 kg of CO2 are released; in addition, 395 kg of coke are produced, which, together with the thermal energy required, has a CO2 contribution of 207 kg. If the emissions for coke and thermal energy are considered to be constant at 207 kg, only 487 kg arise for the hydrogen production. The outcome is that CO2 emission for 100 kg of hydrogen in the prior art is about 11 kg of CO2/kg of H2; in the case of natural gas pyrolysis, this could be only 5 kg of CO2/kg of H2.

The thermal decomposition of hydrocarbons is effected at high temperatures in the range from 800 to 1600° C., and in the case of plasma processes even higher. As a result of the thermodynamic equilibrium and the reaction kinetics, these high temperatures are required specifically for saturated compounds, especially for methane, in order to achieve sufficiently high conversion rates of more than 50% within an acceptably short time (milliseconds to seconds).

For achievement of these high temperatures in pyrolysis processes and in coke production, there are different solutions in the prior art: U.S. Pat. Nos. 2,389,636, 2,600,078, 5,486,216 and 6,670,058 describe the use of the fixed bed as a heat carrier. DE 600 16 59 T, U.S. Pat. No. 3,264,210 and CA 2 345 950 utilize oxidative processes as the heat source in different ways. In U.S. Pat. Nos. 2,799,640, 3,259,565 and DE 1 266 273, an electrical heat source is used; in addition, DE 692 08 686 T describes the use of a plasma burner.

There follows an overview of the prior art in detail:

U.S. Pat. No. 2,389,636 describes the cleavage of hydrocarbons over a preheated bed. The bed consists of ceramic or metallic materials and is heated in a separate chamber prior to entry into the reaction zone. This involves exposing the carrier particles which have been laden with carbon by prior use in the reaction chamber to a hot air stream. The heat released by the carbon combustion is stored in the carrier particles. Consequently, no carbonaceous product is obtained. A continuous mode of operation in a fluidized bed is described; heat recovery is specified as the aim of this mode of operation.

U.S. Pat. No. 2,600,078 describes the production of coke particles of defined particle size in a moving bed. The carbon substrate is circulated, i.e. preheated, introduced into the reactor and discharged from the reactor after the reaction, until it has the desired size. The coating of carbon particles takes place in the liquid phase. The production of hydrogen as a product is not disclosed.

U.S. Pat. No. 5,486,216 discloses introducing the still-hot coke produced in a coking oven into a shaft furnace. The coke, which runs through the shaft furnace as a moving bed from the top downward, is subjected to countercurrent flow of a gas mixture consisting of methane and nitrogen, methane being heated up to its decomposition temperature and decomposing to hydrogen and carbon in an endothermic reaction. The carbon formed is deposited on the coke used and improves the structure thereof, such that it can be used advantageously in a blast furnace. The energy required for the endothermic methane decomposition is drawn from the hot coke, which cools down as a result. Cooled coke, which is drawn off downward from the shaft furnace, is replaced by hot coke, which is introduced into the upper region of the shaft furnace.

U.S. Pat. No. 6,670,058 describes hydrocarbon pyrolysis in a fluidized bed reactor. In an external combustion chamber, partial combustion of discharged carbon and fluid fuels is conducted, and the hot carbon particles are recycled into the reaction chamber as heat carriers. No further heat source is provided in the reaction chamber; in addition, no heat integration is described. Recycling of incompletely converted hydrocarbons as catalyst precursors is disclosed.

The by a preheated bed (per unit of coke) can be obtained and deposited is determined primarily by the energy of the hot coke utilizable for methane decomposition. Since the utilizable energy cannot be increased arbitrarily, for instance by increasing the use temperature of the coke/the bed, it is not possible to deposit any amount of carbon desired. According to U.S. Pat. No. 5,486,216, it is only possible to deposit an amount of carbon of up to 5% of the amount of coke used. This relatively small amount, however, is not always sufficient for processing of coke of any desired quality, for example for use in a blast furnace.

A disadvantage of the external heating of the solid bed and the utilization thereof as a heat carrier is the difficulty of handling hot solids. At temperatures above 1000° C., surface effects in the area of adhesion, agglomeration and abrasion occur to an increased extent, which complicate, for example, introduction into or discharge from a reactor.

DE 600 16 59 T describes a process for pyrolyzing hydrocarbons, in which a portion of the hydrocarbon stream is utilized in order to provide the energy for the pyrolysis. In this case, the pyrolysis is performed in a reaction space permeated by porous tubes in flow direction. The air or oxygen oxidizing agent flows through these. The oxidizing agent penetrates through the porous wall into the reaction space at right angles to the hydrocarbon stream. This forms a thin flame layer close to the porous wall, which supplies the energy for pyrolysis to the reaction space. Neither the use of a carbon carrier nor the production of a carbon product is described.

U.S. Pat. No. 3,264,210 describes the production of coke and hydrogen as coproducts, the hydrogen being used as a fuel in the process. The corresponding reactor consists of two regions. In the first region, the pyrolysis proceeds in a fluidized bed using carbon as a precursor/carrier. The heat transfer from the burner to the pyrolysis reactor is effected by convection and by radiation. In the second region, the coke produced is formulated in a shaft in order to obtain the desired size.

A disadvantage of the direct use of oxidative processes is the introduction of extraneous substances into the reaction zone, and consequently contamination of the products. There is also the risk that the carbon burns off in an unwanted manner or the reactant stream is also combusted. In the case of indirect heat transfer from combustion processes into the reaction zone, large transfer areas would be necessary at the high temperatures required. Realisation of such large transfer areas by means of, for example, internals in the reactor is, however, problematic for a reaction in a moving bed or fluidized bed, for reasons including the blockage of the flow area and the mechanical stress on the internals.

In order to avoid the disadvantages of the use of an oxidative process as the energy source and the disadvantages associated with hot solids handling, the use of electrical energy sources has been proposed:

U.S. Pat. No. 2,799,640 describes the activation of the hydrocarbon decomposition as a gas phase or gas/solid reaction by electrical discharges between the particles of a fluidized bed. As the material for the fluidized bed, the use of carbon is described.

U.S. Pat. No. 3,259,565 describes the cleavage of heavy hydrocarbons to give light hydrocarbons, hydrogen and carbon in a fluidized bed of carbon. Electrical heat supply to the cleavage with the fluidized bed as a resistance heater is described. Also disclosed is the recycling of the coke agglomerates and countercurrent heat exchange with the gaseous product stream above the reaction zone. Below the reaction zone, heat is exchanged between the carbon agglomerates which have grown and the gas supplied.

DE 1 266 273 describes hydrocarbon decomposition into hydrogen and coke, the coke having a high purity and mechanical strength. The heating of the reaction is conducted by electrical resistance, by utilizing the carbon bed, which is described as a moving bed or fluidized bed, as a resistor. Also described is heat integration by countercurrent flow between solid stream and gas stream.

In addition, DE 2 420 579 describes the inductive heating of a coke bed.

DE 692 08 686 T2 describes a plasma reactor as a reaction zone for hydrocarbon pyrolysis. A preheated carbon substrate is injected into the flame of a plasma burner. The mixing zone simultaneously forms the main reaction zone. The reaction is concluded in a downstream delay zone. Hydrogen is partly recycled into the plasma burner, which achieves a partial heat integration. As well as hydrogen, carbon black is obtained as a product. The carbon black is produced homogeneously as primary particles; no use of a substrate is described.

CA 2 345 950 describes the pyrolysis of methane over carbon dust. After the growth of the carbon up to a particular size, it is discharged mechanically. It is stated that the heat can be supplied electrically or via flue gases; unfortunately, no details of the configuration of the heat input are disclosed. Heat integration is possible either via the gas streams or by countercurrent heat exchange between gas stream and solids stream.

The disadvantage of the electrical processes described is, however, that they have high operating and capital costs. It has also not been clarified whether homogeneous heating of the reaction zone can also be achieved on the industrial scale by means of an electrical process.

Due to the disadvantages enumerated, it has not been possible to date, on the basis of the prior art cited, to develop an industrial scale production of the hydrogen and carbon coproducts on the basis of hydrocarbons.

At present, for industrial scale hydrocarbon decompositions, for example for production of synthesis gas or carbon black, direct oxidative processes are used as the energy source (Reimert, R., Marschner, F., Renner, H.-J., Boll, W., Supp, E., Brejc, M., Liebner, W. and Schaub, G. 2011. Gas Production, 2. Processes. Ullmann's Encyclopedia of Industrial Chemistry). In order to achieve the desired high temperatures and reliable heating and operation of the reaction, it has to date been necessary to accept a certain degree of extraneous contamination by the combustion gases, or the risk of combustion of the reactants and/or products.

It is therefore an object of the present invention to indicate a process for preparing the two products of value carbon and hydrogen, which can be implemented with high yield on the industrial scale. It is a further object of the present invention to provide hydrogen with a low CO2 footprint for the chemical industry and for developing mobility, and to utilize the carbon as a material in parallel. It is a further object of the present invention to produce a carbon with high purity which can be used, for example, as injection coal, as a coking coal substitute or even as blast furnace coke in the steel industry. It is a further object of the invention to be able to control the amount of carbon which forms and accumulates on the carbonaceous pellets within a wide range.

The stated object is achieved in accordance with the invention by a process for parallel preparation of hydrogen and one or more carbonaceous products, in which hydrocarbons are introduced into a reaction space and decomposed thermally to carbon and hydrogen in the presence of carbon-rich pellets, wherein at least a portion of the thermal energy required for the hydrocarbon decomposition is provided by means of one or more gaseous heat carriers which are produced outside the reaction space and are then introduced into the reaction zone, it being the case that either (i) the gaseous heat carrier for the hydrocarbon decomposition reaction is inert and/or constitutes a product and/or a reactant in this hydrocarbon reaction or (ii) the gaseous heat carrier does not come into contact with the hydrocarbon stream.

Advantageously at least 50% of the thermal energy required for the hydrocarbon decomposition and for the heat exchange is provided by means of gaseous heat carriers, preferably more than 80%, especially more than 90%. It is also possible to use further energy sources known from the prior art. Preference is given to a combination with electrical resistance heating, electrical induction heating or radiation heating.

Carbonaceous pellets are understood in the present invention to mean a material which advantageously consists of solid particles having at least 50% by weight, preferably at least 80% by weight and especially at least 90% by weight of carbon. The carbonaceous pellets advantageously have a particle size, i.e. an equivalent diameter determinable by sieving with a particular mesh size, of 0.5 to 100 mm, preferably of 1 to 80 mm. The carbonaceous pellets are advantageously spherical. In the process according to the invention, it is possible to use a multitude of different carbonaceous pellets. Such pellets may consist, for example, of coal, coke, coke breeze and/or mixtures thereof. Coke breeze generally has a particle size of less than 20 mm. In addition, the carbonaceous pellets may contain 0 to 15% by weight, based on the total mass of the pellets, preferably 0 to 5% by weight, of metal, metal oxide and/or ceramic. Particular preference is given to using pellets comprising coke breeze and/or low-grade coke, coke from a coking plant based on brown or hard coal and/or coke obtained from biomass, i.e. material not directly suitable for the metallurgical process.

Due to its small particle size, coke breeze is unsuitable for direct use in a blast furnace. The particle size of the blast furnace coke is between 35 mm and 80 mm, preferably between 50 mm and 60 mm. These sizes ensure the required perviosity of the coke bed to the combustion air and to the melt in a blast furnace.

Advantageously, 5 to 10 times the amount of solid mass of the carbonaceous pellets is used compared to the mass of hydrogen produced, preferably 6 to 8 times.

The carbon formed by the inventive decomposition reaction accumulates advantageously to an extent of at least 90%, based on the total mass of the carbon formed, preferably at least 95%, on the carbonaceous pellets.

A carbonaceous product is understood in the present invention to mean a product which consists of carbon advantageously to an extent of at least 90% by weight, preferably to an extent of at least 95% by weight, more preferably to an extent of at least 98% by weight, especially to an extent of at least 99% by weight. The carbonaceous product contains advantageously less than 5%, preferably less than 1%, more preferably less than 0.1%, based on the total mass of the carbonaceous product, of ash. The carbonaceous product contains advantageously less than 5% by weight, preferably less than 1% by weight, more preferably less than 0.1% by weight, based on the total mass of the carbonaceous product, of alkalis, especially oxides and hydroxides of the alkali metals and alkaline earth metals, sulphur compounds and/or phosphorus compounds. These carbonaceous products can be used, for example, in the steel industry as injection coke, as a coking coal additive or as blast furnace coke.

Advantageously, the process according to the invention deposits at least 5% by weight, based on the original total mass of the pellets, of carbon on the carbonaceous pellets used, preferably at least 10% by weight, more preferably at least 20% by weight and especially at least 30% by weight. The mass of the carbonaceous pellets used can advantageously be increased by the process according to the invention by 5% by weight to 50% by weight, based on the original total mass of the pellets, preferably by 10% by weight to 45% by weight, more preferably by 20 to 30% by weight.

A preferred configuration of the process according to the invention envisages that the thermal energy required for the gaseous heat carrier and hence for the hydrocarbon decomposition is produced by oxidation or partial oxidation of a fuel comprising hydrocarbons and/or hydrogen. The hydrogen may consist, for example, of hydrogen recovered in the hydrocarbon decomposition, which is drawn off from the reaction space and, optionally after possible purification (for example dust removal) fed to the burner. The oxidizing agents used are preferably air and/or oxygen-enriched air and/or oxygen of technical grade purity. Oxidation or partial oxidation are performed outside the reaction space, for which the fuel is mixed with an oxidizing agent and reacted. The hot gas formed advantageously has temperatures in the range from 800 to 2200° C., preferably 1000 to 1800° C. The hot gas formed is subsequently either utilized in order to heat up a gaseous heat carrier inert to the hydrocarbon reaction and/or a heat carrier which constitutes a product and/or a reactant of this hydrocarbon reaction, which is subsequently introduced into the reaction space and conducted through the carbonaceous pellets, where it releases a portion of its tangible heat to the carbonaceous pellets and/or the hydrocarbons to be decomposed. The gaseous heat carrier inert to the hydrocarbon reaction is advantageously nitrogen; the heat carrier which constitutes a product and/or reactant of this hydrocarbon reaction is preferably hydrogen.

Alternatively, the hot combustion gas can be introduced directly into the reaction space, where it releases a portion of its tangible heat directly to the carbonaceous pellets and/or the hydrocarbons to be decomposed. If the gaseous heat carrier is passed directly into the reaction space, it is fed in such that it does not come into contact with the hydrocarbon stream. This is achievable, for example, with a cyclic mode of operation of the inventive reaction, where there are at least two cycles. Advantageously, there is at least one heating cycle in which heating is effected by the introduction/passage of the hot gaseous heat carrier, and at least one reaction cycle in which the hydrocarbons are passed through the heated carbonaceous pellets. During the heating cycle, more preferably, no hydrocarbon flows into/through the reactor. During the reaction cycle, more preferably, no gaseous heat carrier flows into/through the reactor. One cycle is advantageously between 30 s and 7200 s, preferably between 60 s and 3600 s, and more preferably between 300 s and 1200 s. The heating cycle is preferably shorter than the reaction cycle; the ratio of the cycle times of heating cycle to reaction cycle is more preferably 1:2, 1:3 or 1:4. For example, the cycle length can be adjusted via the volume flow rate. The process according to the invention is preferably conducted quasi-continuously using two or more reactors of the same type.

Advantageously, the process according to the invention is performed without using an oxidizing agent in the reaction space.

The process according to the invention allows, through the introduction of the gaseous heat carrier, supply of a heat flow density of greater than 100 kW/m$^3$, preferably greater than 500 kW/m$^3$ and more preferably greater than 1000 kW/m$^3$, based on the bed volume of the reaction zone (volume-based heating output).

In another configuration, the gaseous heat carrier is produced with the aid of an electrical heating device arranged outside the reaction space, through which a gas stream is conducted and heated with the aid of a light arc before being introduced into the reaction space with a temperature between 2000 and 5000° C., preferably between 3500 and 4000° C., or serving for heating of a gaseous heat carrier which is inert to the hydrocarbon decomposition reaction and/or constitutes a product and/or reactant of this hydrocarbon reaction. The heat carrier thus heated is then introduced into the reaction space. In the reaction space, the gaseous heat carrier releases its heat to the reactant(s). The gas stream may consist, for example, of hydrogen obtained in the hydrocarbon decomposition, which is drawn off from the reaction space and, after possible purification (for example dust removal) is fed to the electrical heating device and at least partly ionized.

The CO2 emission in the process according to the invention, for 100 kg of hydrogen, is advantageously less than 10 kg of CO2/kgH2, preferably less than 8 kg of CO2/kgH2, especially less than 6 kg of CO2/KgH2.

The energy to be provided in the process according to the invention is, per mole of methane converted, advantageously less than 500 kJ, preferably less than 400 kJ, more preferably less than 250 kJ, especially less than 150 kJ.

The inventive thermal decomposition reaction of hydrocarbons is advantageously performed at a mean temperature in the reaction zone of 800 to 1600° C., preferably between 1100 and 1400° C.

The inventive thermal decomposition reaction of hydrocarbons is advantageously performed at atmospheric pressure up to a pressure of 50 bar.

The residence time in the reaction zone in the inventive decomposition reaction is advantageously 0.5 to 25 minutes, preferably 1 to 60 seconds, especially 1 to 30 seconds.

The hydrogen volume flow rate of the process according to the invention is typically between 1000 and 50 000 cm (STP)/h, preferably between 10 000 and 30 000 cm (STP)/h, especially between 15 000 and 25 000 cm (STP)/h.

The mass flow ratio between the hydrocarbon gas and the carbonaceous pellets is advantageously between 1.5 and 3, preferably between 1.8 and 2.5.

The reaction space advantageously has a cylindrical cross section and the complete volume thereof is accessible both to the solid and gaseous reaction streams and to the gaseous heat carrier.

The carbonaceous pellets are preferably conducted through the reaction space as a moving bed, and the hydrocarbons to be decomposed are appropriately conducted in countercurrent to the pellets. For this purpose, the reaction space is sensibly designed as a vertical shaft, such that the movement of the moving bed arises solely under the action of gravity. The flow through the moving bed is advantageously homogeneous and uniform. However, the carbonaceous pellets can also be conducted through the reaction space as a fluidized bed. Both variants allow a continuous or quasi-continuous mode of operation.

If the carbonaceous pellets are conducted through the reaction space as a moving bed, a particularly preferred configuration of the process according to the invention envisages that the pellets are introduced into the reaction space at ambient temperature, first heated therein up to a maximum temperature and then cooled again, the maximum temperature being between 800 and 1600° C., preferably between 1100 and 1400° C. The cooling can be conducted down to advantageously a maximum of 500 K, preferably down to a maximum of 300 K and more preferably down to a maximum of 50 K above ambient temperature, such that no cooling or quenching of the coke drawn off from the reaction space is required. For formation and maintenance of the temperature profile described, it is proposed that a gas, which preferably contains hydrocarbons to be decomposed, be introduced into the reaction space at ambient temperature and conducted through the moving bed in countercurrent. On its way through the reaction space, the gas exchanges heat with the moving bed, which heats the gas up to the decomposition temperature of the hydrocarbon and simultaneously cools the moving bed. Hot hydrogen generated in the decomposition is conducted further in countercurrent through the moving bed together with unreacted constituents of the gas and cooled in direct heat exchange therewith, such that a hydrogen-containing gas mixture can be drawn off from the reaction space with a temperature close to the ambient temperature. Thermal energy required for the hydrocarbon decomposition is introduced by the gaseous heat carrier, especially at sites in the reaction space at which hydrocarbons are decomposed. However, there is no intention to rule out the production and/or introduction of thermal energy elsewhere in the reaction space.

The hydrogen-containing gas mixture produced in accordance with the invention is preferably subjected to a purification and separated into a fraction consisting of hydrogen of technical grade purity, and a residual stream comprising hydrogen and hydrocarbons. The residual stream is advantageously recycled at least partly as a recycle stream into the reaction space, in order to increase the hydrogen yield by decomposition of the hydrocarbons present. Another portion of the residual stream is advantageously sent to a burner and thus serves as a fuel for the oxidation, which advantageously affords the thermal heat required for the gaseous heat carrier and hence for the decomposition reaction.

Using hydrogen as the gaseous heat carrier, it is possible, for example, to draw off a portion of the hydrogen of technical grade purity from the product stream, in order to heat it with the aid of the hot gases produced in the burner, for example in a heat exchanger, and then to supply it (again) to the reaction zone.

The particles of which the carbonaceous product drawn off from the reaction space consists are of varying particle size and density, such that direct use of the carbonaceous product, for example as blast furnace coke, is possible only in some cases. Advantageously, a blast furnace coke has a particle size between 35 and 80 mm and a density between 0.9 g/cm$^3$ and 1.1 g/cm$^3$. The invention therefore envisages classifying the carbonaceous product drawn off from the reaction space by sieving and/or sifting. Particles within the required specification are discharged as product. Particles whose diameter is too small or whose density is too low or too high for the intended use are preferably returned back to the same reaction space or one operated in parallel. Particles with excessively large diameters are crushed before they are recycled, and the fines are returned.

In principle, all hydrocarbons can be introduced into the reaction chamber and decomposed, but preference is given to light hydrocarbons, for example methane, ethane, propane, butane. A particularly preferred configuration of the process according to the invention envisages introduction of natural gas, the methane content in the natural gas typically being between 75 and 99% of the molar fraction, depending on the natural gas deposit, into the reaction space and decomposition of methane to hydrogen and carbon.

For production of a high-purity hydrogen product, it may be necessary to purify the streams to be introduced into the reaction space to remove substances which themselves are undesirable in the hydrogen product or which can be converted to undesirable substances in the reaction space. Additionally or alternatively, undesirable substances can also be removed from the gases drawn off from the reaction space. The undesirable substances include, for example, sulphur compounds, mono- or polycyclic aromatics, for example benzene, toluene, xylene and/or naphthalene, and other hydrocarbons which may be present, inter alia, in natural gas.

One configuration of the process according to the invention therefore envisages passage of a gas which occurs in the process through a coke bed for purification to free it of substances which are themselves undesirable in the hydrogen product or can be converted to undesirable substances in the reaction space. Depending on the quality thereof, the coke laden with undesirable substances in the gas purification can be disposed of by incineration or sent to a coking plant as a feed.

Compared to the prior art in the field of coke production, the process according to the invention offers the possibility of producing high-grade coke without complex and/or environmentally damaging coke cooling in a closed apparatus. A further advantage over the prior art can be considered to be the fact that the process according to the invention can be performed without the use of coking coal, the prices of which will rise considerably in the foreseeable future.

The process according to the invention allows the amount of carbon obtained to be controlled within a wide range by the inventive heat input which has good regulability, has a rapid response in the reactor and is substantially independent of the amount of carbonaceous pellets used. More particularly, the process according to the invention allows the specific amount of carbon deposited on the pellets to be considerably increased compared to the prior art.

The process according to the invention allows the hydrogen and carbon coproducts to be produced on the industrial scale, inter alia, through the integrated heat recycling, the unstructured reactor volume and the utilization of a gaseous heat carrier; moreover, these products have a small CO2 footprint.

The use of CO2 as a chemical raw material for mass production requires activation, for example to give synthesis gas, by a reducing agent of maximum climatic neutrality. The provision of hydrogen by a low-CO2 and inexpensive process is the key for this purpose. This hydrogen allows a CO2 activation by reverse water gas shift reaction (RWGS) to utilize sufficient CO2 to open up significant potential for CO2 savings.

The invention is to be illustrated hereinafter with reference to a working example shown schematically in FIG. 1.

FIG. 1 shows one variant of the process according to the invention, in which blast furnace coke is obtained in a continuous process with the aid of a gaseous heat carrier.

Via the feed 1, carbonaceous pellets, which are, for example, coke breeze, are introduced at ambient temperature from above into the reaction space R, through which they are subsequently conducted downward in a moving bed W under the action of gravity. A gas 2 comprising hydrocarbons, which is preferably natural gas, is simultaneously passed into the reaction space R from the bottom and conducted upward through the moving bed W in countercurrent. The gas 2, which is at ambient temperature when it enters the reaction space R, is heated on its way upward in direct heat exchange with the moving bed W up to the decomposition temperature of the hydrocarbons, which decompose under these conditions to hydrogen and carbon in an endothermic reaction. The carbon formed here is deposited to an extent of more than 95% by weight onto the carbonaceous particles of the moving bed W, which improves the quality thereof. Together with hydrocarbons which have been converted only partly, if at all, the hot hydrogen formed flows further upward, in the course of which it is cooled in direct heat exchange with the moving bed W, such that a hydrogen-containing gas mixture can be drawn off via line 3 and introduced into the separating device T with a temperature above ambient temperature but at least 500 K below the reaction temperature. The hydrogen-containing gas mixture 3 is separated in the separating device T into a fraction 4 consisting of hydrogen of technical grade purity and a residual stream 9 comprising hydrogen and hydrocarbons. A portion of the residual stream 9 is used, in a burner with supply of an oxidizing agent 11, to produce a hot gas 5 which releases its heat to a portion of the hydrogen fraction 4 of technical grade purity using a heat exchanger WT. The remainder 10 of the hydrogen fraction of technical grade purity is released as the hydrogen product. The other portion of the residual stream 9 is recycled into the reaction space R as a recycle stream to increase the hydrogen yield. The heated portion of the hydrogen fraction is introduced into the reaction space R and provides the predominant portion of the energy required for the hydrocarbon decomposition therein. At the lower end of the reaction space R, pellets 6 are drawn off at virtually ambient temperature, and these can be used, for example, as blast furnace coke or as a coking plant additive due to the carbon deposits.

Constituents of the pellets 6 which do not meet the quality requirements because they have too great a diameter (>80 mm) or too small a diameter (<35 mm) or, for example, too low a mechanical strength (have tumbler strength 140 for blast furnace coke of >40% to ISO/FDIS 18894:2003) are removed in the separating device S by sieving and/or sifting and, after a possible comminution, recycled via line 7 back into the reaction space R. The remaining residue 8 is blast furnace coke, which is released as a high-grade product.

The invention claimed is:

1. A process for parallel preparation of hydrogen and a carbonaceous product, the process comprising introducing hydrocarbons into a reaction space and thermally decomposing the hydrocarbons to carbon and hydrogen in the presence of carbon-rich pellets,
wherein:
at least a portion of thermal energy required for the hydrocarbon decomposition is provided by a gaseous heat carrier;
the thermal energy is produced outside the reaction space and the gaseous heat carrier thus heated is then introduced into the reaction space;
the gaseous heat carrier is inert, constitutes a product formed by decomposition of the hydrocarbons, or both; and
the gaseous heat carrier releases heat to reactants in the reaction space.

2. The process according to claim 1, wherein the gaseous heat carrier is heated by hot gas which is produced by oxidation or partial oxidation of hydrocarbons, hydrogen, or both, for which at least one selected from the group consisting of air, oxygen-enriched air, and oxygen of technical grade purity is an oxidizing agent.

3. The process according to claim 1, wherein hydrogen, nitrogen, or both is the gaseous heat carrier.

4. The process according to claim 1, wherein at least 50% of the thermal energy required for the hydrocarbon decomposition and heat recycling is provided by the gaseous heat carrier.

5. The process according to claim 1, wherein the carbon-rich pellets comprise at least 80% by weight of carbon and have a particle size of from 0.1 to 100 mm.

6. The process according to claim 1, wherein the carbon-rich pellets are conducted continuously through the reaction space as a moving or fluidized bed.

7. The process according to claim 6, wherein hydrogen formed in the hydrocarbon decomposition is conducted through the moving or fluidized bed in countercurrent to the carbon-rich pellets and is cooled therewith by direct heat exchange.

8. The process according to claim 1, wherein a portion of carbonaceous pellets drawn off from the reaction space are recycled back into the reaction space.

9. The process according to claim 1, wherein the carbon-rich pellets comprise at least one selected from the group consisting of coke breeze, low-grade coke from a coking plant based on brown or hard coal, and coke obtained from biomass.

10. The process according to claim 6, wherein the hydrocarbons are introduced into the reaction space at ambient temperature and are conducted through the moving or fluidized bed in countercurrent to the carbon-rich pellets.

* * * * *